US005893977A

United States Patent [19]
Pucci

[11] Patent Number: 5,893,977
[45] Date of Patent: Apr. 13, 1999

[54] WATER IONIZER HAVING VIBRATION SENSOR TO SENSE FLOW IN ELECTRODE HOUSING

[75] Inventor: Joseph D. Pucci, Hinckley, Ohio

[73] Assignee: Hercules Products, Brunswick, Ohio

[21] Appl. No.: 08/854,652

[22] Filed: May 12, 1997

[51] Int. Cl.[6] .............................. B01D 17/12; C02F 1/467
[52] U.S. Cl. ...................... 210/739; 73/861.18; 210/87; 210/243; 210/746; 210/748; 422/22; 422/186.04
[58] Field of Search ..................... 210/85, 87, 94, 210/143, 149, 169, 243, 739, 742, 748, 767, 746; 422/22, 186.04, 116; 73/861.18, 570; 204/228, 651

[56] References Cited

U.S. PATENT DOCUMENTS

| 3,580,092 | 5/1971 | Scarpa | 73/861.18 |
|---|---|---|---|
| 4,322,297 | 3/1982 | Bajka | 210/742 |
| 4,337,136 | 6/1982 | Dahlgren | 204/242 |
| 4,525,253 | 6/1985 | Hayes et al. | 204/149 |
| 4,713,170 | 12/1987 | Saibic | 210/85 |
| 4,734,176 | 3/1988 | Zemba, Jr. et al. | 204/149 |
| 4,752,401 | 6/1988 | Bodenstein | 210/746 |
| 4,936,979 | 6/1990 | Brown | 210/85 |
| 4,986,906 | 1/1991 | Dadisman | 210/169 |
| 5,217,607 | 6/1993 | Dalton, III et al. | 210/143 |
| 5,221,444 | 6/1993 | Silveri | 204/149 |
| 5,514,283 | 5/1996 | Stefanini | 210/87 |
| 5,543,040 | 8/1996 | Fite, Jr. et al. | 210/167 |
| 5,584,992 | 12/1996 | Sugimoto | 210/169 |

*Primary Examiner*—Joseph W. Drodge
*Attorney, Agent, or Firm*—Pearne, Gordon, McCoy & Granger, LLP

[57] ABSTRACT

An ionizer for treating swimming pool water including an enclosure and an electrode housing. The electrode housing is removably secured to a wall of the enclosure and integrally includes a mounting bracket, a hollow cylindrical body, a sensor well, and a projection. The projection sealingly receives a pair of ion-producing electrodes. A vibration sensor is attached to an interior surface of the housing, and is operable to sense when water is flowing through the electrode housing. A method for determining and indicating when the electrodes need replacement is also disclosed.

12 Claims, 2 Drawing Sheets

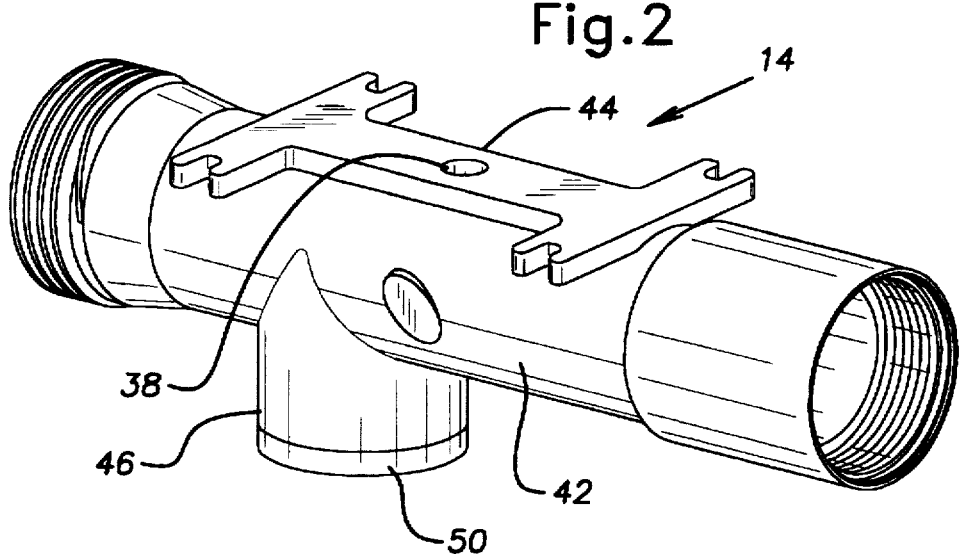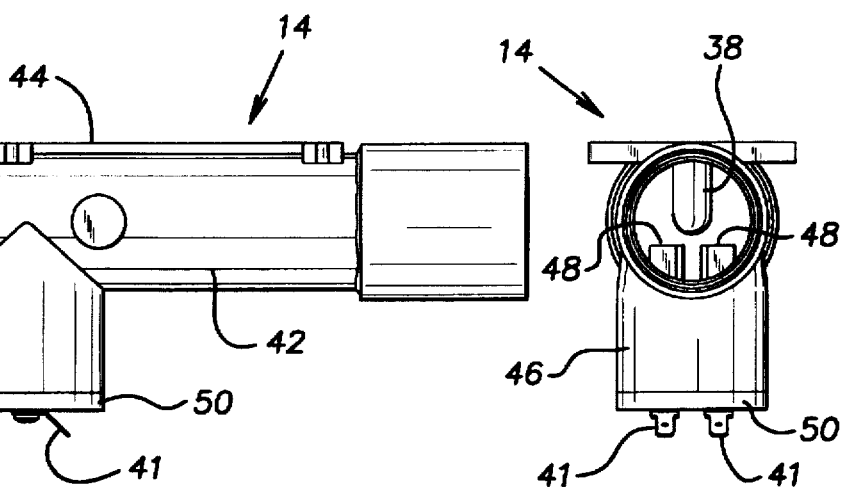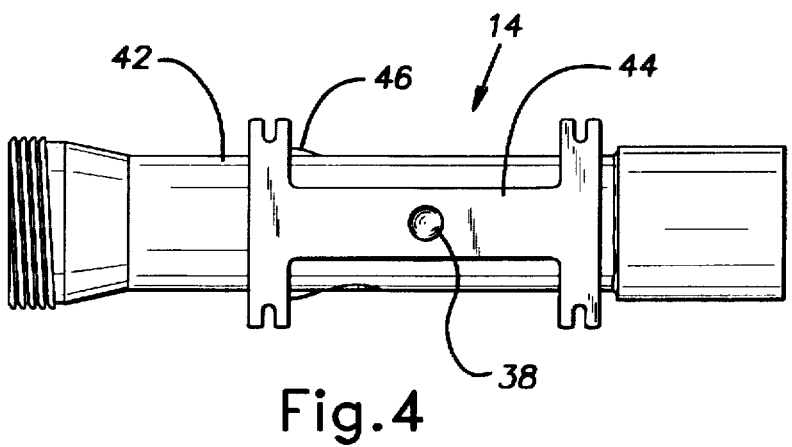

WATER IONIZER HAVING VIBRATION SENSOR TO SENSE FLOW IN ELECTRODE HOUSING

BACKGROUND OF THE INVENTION

1. Field of the Invention

The present invention generally relates to water treatment devices and, more particularly, to swimming pool ionizers.

2. Description of the Related Art

Water ionizers for treating water, particularly swimming pool water, are known in the art. Typically, such ionizers have a pipe in which a pair of destructible electrodes are disposed. When a voltage is developed between the electrodes, ions are released from one electrode and attempt to jump to the other electrode. However, when water is flowing through the pipe, the ions are diverted by the water flow. Copper/silver electrodes are used since copper and silver are toxic to various types of viral, bacterial, and plant life. Therefore, using an ionizer in a swimming pool reduces the growth of algae and helps maintain hygienic water conditions.

U.S. Pat. No. 4,713,170 discloses such an ionization system. The '170 system includes a T-shaped pipe having an input, an output, and a central opening. A pressure fitting is secured in the central opening, and includes an anode, a cathode, and a temperature sensor. First and second bar graphs are displayed by the ionizer. The first bar graph represents pool demand and is proportional to temperature. The user adjusts voltage through the anode via a potentiometer to alter the displayed second bar graph, which is proportional to ion output. The user adjusts the second bar graph display to match the first bar graph display and thereby match ion supply with pool demand.

Similarly, U.S. Pat. No. 5,221,444 discloses an electrolytic pool purification system that includes an anode, a cathode, and a pump sensor. The pump sensor senses when the pump is operating and controls the supply of power to the anode/cathode so that ions are only produced when the pump is operating. The pump sensor senses pump current to determine whether the pump is in operation. The '444 patent suffers from the disadvantage that the pump sensor of the electrolytic pool purification system must be hard-wired to the pump, and therefore represents an increase in cost to the pool owner.

Therefore, there exists a need in the art for a water ionizer which is operable generally only when the pump is operating to move water through the pool, but wherein the water ionizer is not wired to the pump. There also exists a need in the art for a water ionizer which provides some indication to the user that the electrodes need to be replaced.

SUMMARY OF THE INVENTION

The present invention is directed toward a water ionizer which operates when a pool pump is moving water through the pool. The present invention is further directed toward a water ionizer which indicates to the user that the electrodes need to be replaced.

In accordance with the present invention, a water ionizer has an enclosure and an electrode housing. The enclosure has a plurality of walls surrounding electrical components of the ionizer. The electrode housing is secured to one of the enclosure walls, and serves as a conduit through which water flows.

In further accordance with the present invention, a vibration sensor is secured to an interior surface of one of the enclosure walls. The sensor is operable to sense water flow within the electrode housing.

In further accordance with the present invention, the electrode housing has a hollow cylindrical body, a mounting bracket, and a projection. The projection has a pair of electrodes sealingly received therein and disposed within the path of water flow through the cylindrical body. The mounting bracket, cylindrical body, and projection are integrally formed in one piece.

In further accordance with the present invention, the electrode housing defines a well which extends downwardly into the cylindrical body transverse to an axis of the cylindrical body. The well receives a temperature sensor projecting through a bottom wall of the enclosure. The mounting bracket is removably secured to the bottom wall.

The present invention is further directed toward a water ionizer having a pair of ion-generation electrodes and means for indicating to the user that the electrodes need replacement. A light is illuminated when the electrodes have eroded.

BRIEF DESCRIPTION OF THE DRAWINGS

These and further features of the present invention will be apparent with reference to the following description and drawings, wherein:

FIG. 2 is a perspective view showing an electrode housing according to the present invention;

FIG. 3 is a front elevational view of the electrode housing shown in FIG. 2;

FIG. 4 is a top plan view of the electrode housing shown in FIG. 2; and

FIG. 5 is an end elevational view of the electrode housing shown in FIGS. 2–4.

DETAILED DESCRIPTION OF THE PREFERRED EMBODIMENT

Figure 1:
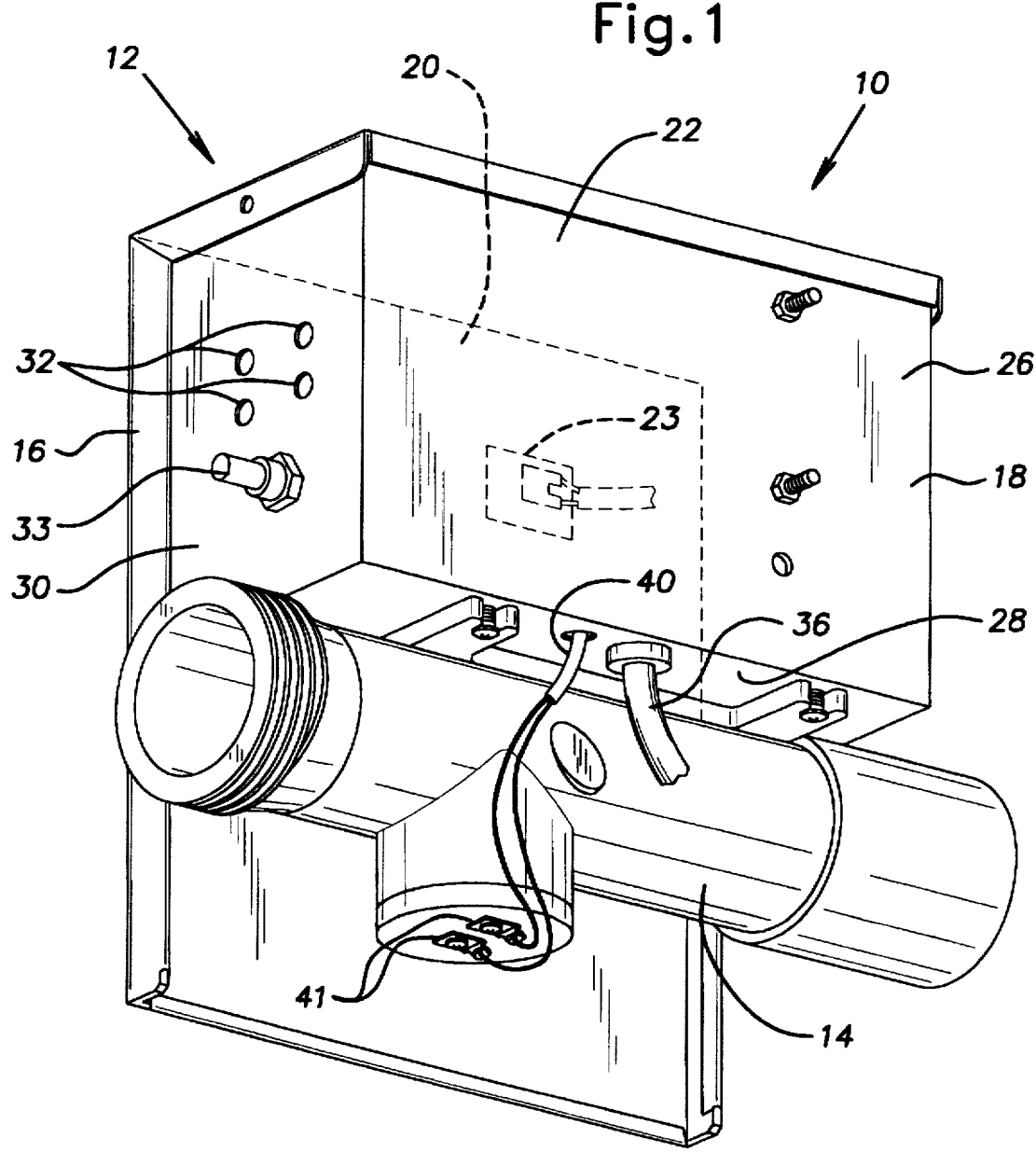
FIG. 1 is a perspective view showing a rear, side, and bottom view of a water ionizer according to the present invention.

It should be noted that in the detailed description which follows, identical components have the same reference numeral, regardless of whether they are shown in different embodiments of the present invention. It should also be noted that, in order to clearly and concisely disclose the present invention, the drawings may not necessarily be to scale and certain features of the invention may be shown in somewhat schematic form.

With reference to the drawing figures, a water ionizer 10 according to the present invention is shown to generally include an enclosure 12 to which is secured an electrode housing 14. The enclosure 12 receives and surrounds a series of electrical components that control and indicate operation of the ionizer, as will be discussed more fully hereinafter.

The enclosure 12 is preferably provided by a first piece 16 and a second piece 18. The first piece 16 is L-shaped in cross-section and provides front and top walls 20, 22 of the enclosure. The inner surface of the front wall 20 has one or more circuit boards (not shown) and a piezo-electric vibration sensor 23 secured thereto. The piezo-electric sensor 23 is preferably adhered to the front wall by a suitable adhesive, such as a pressure sensitive adhesive. One such sensor which has been successfully used by the applicant is manufactured by AMP and sold as the LDT series element (LDT 0-028K/L), part number 1002794-2. The front wall 20 also has an opening therein through which a temperature display (not shown) is visible. The front and top walls 20, 22 include a peripheral flange 24 to which the enclosure second piece 18 is secured by means of sheet metal screws.

The enclosure second piece 18 defines rear, bottom and lateral side walls 26, 28, 30 of the enclosure 12, and generally overlies the circuit boards. As such, the first and second pieces 16, 18 cooperate to define a space in which the electronics are received. The front wall 20 extends downwardly below the bottom wall 28, and conceals the electrode housing 14. The bottom wall 28 includes a series of openings into which electrode housing mounting screws are threadably received. Accordingly, the electrode housing 14 is generally disposed beneath the bottom wall 28 and behind the front wall 20 and, as such, is protected from damage.

The lateral side wall 30 has an indicator circuit board (not shown) secured to an inner surface thereof. The indicator circuit board has a plurality of light-emitting diodes or lamps that are visible through a like number of openings 32 in the side wall 30. The lights or LEDs are illuminated to indicate operation of the ionizer (i.e., power on/off; service required; BAR 1; BAR 2), as will be apparent from the discussion to follow. The indicator circuit board also has rotary adjustment shaft 33 extending therefrom. The shaft 33 projects through the sidewall 30 and permits the user to adjust the operation of the ionizer, as will be described hereafter. The rear wall 26 has a transformer secured thereto which provides power, at a reduced voltage, to the circuit board.

The bottom wall 28 has an opening through which a power cord 36 extends, an electrode lead wire opening through which an electrode lead wire 40 extends, and a sensor opening through which a temperature sensor (not shown) extends into a well 38 provided by the electrode housing 14. The power cord 36 supplies household power to the transformer. The electrode lead wire 40 extends from the front circuit board to electrode terminals 41 on the electrode housing 14.

The electrode housing 14 defines a portion of the water flow path between a pool filter/pump (not shown) and a pool (not shown). More specifically, the electrode housing 14 has a cylindrical body 42 to which a mounting bracket 44 is secured and from which a cylindrical projection 46 extends. The mounting bracket 44 provides a generally planar outer or upper surface which abuts an outer or exterior surface of the enclosure bottom wall 28. The mounting bracket 44 has an opening formed therein through which the temperature sensor well 38 is accessible. The temperature sensor well 38 extends into the hollow interior of the body 42 and permits a temperature sensor inserted in the well 38 to monitor temperature of water flowing within the electrode housing 14. The cylindrical projection 46 is generally on an opposite side of the body 42 from the mounting bracket 44, and extends away from the mounting bracket 44. As such, the electrode housing 14 is T-shaped, with one arm of the "T" being longer than the other, as illustrated best in FIG. 3. The cylindrical projection 46 is adapted to receive a cap 50 comprising a pair of electrodes 48.

In the preferred and illustrated embodiment, the cap 50 is sealingly secured within the cylindrical projection 46. The electrodes 48 extend or project into the hollow interior of the body 42. Each of the electrodes 48 is connected to power via the associated electrode terminal 41 extending from the cap 50 and lead wire 40.

The electrodes 48 are supplied with power in an alternating fashion to ensure that the electrodes wear or erode at a uniform or even rate. The supply of power is regulated by the front control board such that the polarity of the electrodes is switched periodically, such as every 30 seconds of operation.

The lamps or LED's are illuminated corresponding to the operation of the water ionizer. One lamp is illuminated when the ionizer is turned on. A second lamp is illuminated when one of the electrodes is supplied with current, and a third lamp is illuminated when electrode 48 polarity is switched to supply the other one of the electrodes 48 with current. The fourth lamp is illuminated when the ionizer requires service. The "service required" lamp will illuminate when conditions are indicative of the electrodes 48 being worn or eroded to the point of not being further useful. Typically, the "service required" light is illuminated when, during otherwise normal operation of the ionizer, the current between the electrodes 48 falls below a predetermined minimum level. This may occur when power is no longer supplied to the electrodes 48 due to a loose connection, or when the electrodes are eroded.

When the ionizer is initially powered-up, the "service required" light may be illuminated due to the low level of total dissolved solids. It is important to build up a copper residual from an initial zero level to an operating level of between about 0.3–0.5 ppm. Accordingly, the control knob is turned to the full-on or maximum position to quickly build up the copper residual to an operating level between 0.3–0.5 ppm. However, copper residual is not easily built-up when the total dissolved solids is less than 1000 ppm. The total dissolved solids can be quickly increased by adding salt to the pool water, thereby permitting the establishment of a copper residual.

The user will preferably test the copper residual on a regular basis and maintain the copper residual between about 0.3–0.5 ppm by adjusting the control shaft 33 between an "off" position and a "full-on" position. At the end of the useful life of the electrodes, the electrodes will be eroded to the point that current will not flow between the electrodes 48, and the "service required" light will be illuminated to indicate to the user that the electrodes need to be replaced. In the preferred embodiment, the electrodes 48 are replaced by replacing the electrode housing 14. Alternatively, the cap 50, with integral electrodes 48, could be replaced.

The control shaft 33 setting required to maintain the residual copper within the desired operational parameters depends upon several factors, such as the usage/demand placed on the pool filter and the duty cycle of the pool pump. For example, and with all other parameters being constant, the more the pump runs, the lower the ionizer setting to maintain residual copper within the desired parameters. On the other hand, the less the pump runs, the higher the ionizer setting.

The ionizer according to the present invention works as follows. When the pool pump is operating, vibrations caused by water flowing through the body 42 of the electrode housing 14 are transmitted through the enclosure 12 and detected by the vibration sensor 23, causing the front circuit board to activate or power the electrodes 48 in an alternating fashion. The electrodes 48 will continue to be energized and supply ions to the water stream until vibrations are no longer sensed by the sensor 23, meaning that the pump has switched off, and water is no longer being pumped through the electrode housing body 42. When vibrations are no longer detected by the sensor 23, the ionizer is de-activated.

Monitoring and sensing vibrations directly at the ionizer 10 provides several advantages. Firstly, sensing vibrations ensures that each time the pump operates, power will be supplied to the electrodes to introduce ions, such as copper and silver ions, into the pool water to reliably maintain the copper residual within the desired parameters to help control algae, bacteria, and virus within the pool water. Secondly, activating the ionizer dependent upon vibrations sensed remotely from the pump allows the ionizer to be reliably turned on/off without being directly wired to the pump. As such, the ionizer can be simply inserted or installed in the conventional swimming pool plumbing and plugged into a grounded household power outlet. This enables the ionizer according to the present invention to be retrofitted into existing pool installations.

While the preferred embodiment of the present invention is shown and described herein, it is to be understood that the same is not so limited but shall cover and include any and all modifications thereof which fall within the purview of the invention.

What is claimed is:

1. A water ionizer, comprising:
   an enclosure having a plurality of walls cooperating to surround electrical control components;
   an electrode housing, said housing being secured to one of said enclosure walls;
   a pair of electrodes disposed within said electrode housing and operable to ionize water flowing through said electrode housing;
   a vibration sensor operable to sense water flow within said electrode housing, said vibration sensor being secured to said enclosure at a location remote from said electrode housing and receiving vibrations via said enclosure.

2. A water ionizer according to claim 1, wherein said electrode housing comprises a hollow cylindrical body, a mounting bracket, and a projection, said projection having said pair of electrodes sealingly secured therein.

3. A water ionizer according to claim 2, wherein said mounting bracket, cylindrical body, and projection are integrally formed in one piece.

4. A water ionizer according to claim 3, wherein said electrode housing further comprises a well which extends downwardly into said hollow cylindrical body, said well being adapted to receive a temperature sensor.

5. A water ionizer according to claim 4, wherein said temperature sensor extends through said one of said enclosure walls and into said well.

6. A water ionizer according to claim 5, wherein said mounting bracket is removably secured to said one of said enclosure walls.

7. A water ionizer according to claim 2, wherein said mounting bracket is disposed on a side of said body diametrically opposite said projection, said bracket having a generally planar outer surface abutting said one of said enclosure walls.

8. A water ionizer according to claim 7, wherein said mounting bracket, cylindrical body, and projection are integrally formed in one piece.

9. A water ionizer according to claim 8, wherein said mounting bracket defines an opening through which a temperature sensor is inserted into a well, said well projecting into the hollow interior of said cylindrical body generally transverse to an axis of said body.

10. A water ionizer according to claim 9, wherein said electrode housing is secured to a bottom wall of said enclosure and said vibration sensor is secured to a side wall of said enclosure, vibrations caused by water flow within said housing being transferred to said vibration sensor via said mounting bracket, bottom wall, and side wall.

11. A method for operating a water ionizer, said ionizer being operable to supply metal ions to pool water when a pool pump is operating, comprising the steps of:
   providing a water ionizer having an electrode housing;
   providing a sensor mounted on an ionizer enclosure remote from said electrode housing;
   sensing vibrations indicative of water flow through said electrode housing as a result of pump operation, said vibrations being transmitted through said ionizer enclosure;
   activating said water ionizer in response to said sensed vibrations.

12. A method according to claim 11, wherein said ionizer includes a pair of electrodes, comprising the further steps of:
   monitoring current flow through said electrodes to determine when said electrodes are eroded; and,
   indicating to a user that said ionizer needs service when said electrodes are determined to be eroded to a predetermined extent.

* * * * *